Feb. 16, 1937. G. BUELNA 2,071,109
SPRINKLER
Filed March 12, 1935 2 Sheets-Sheet 1
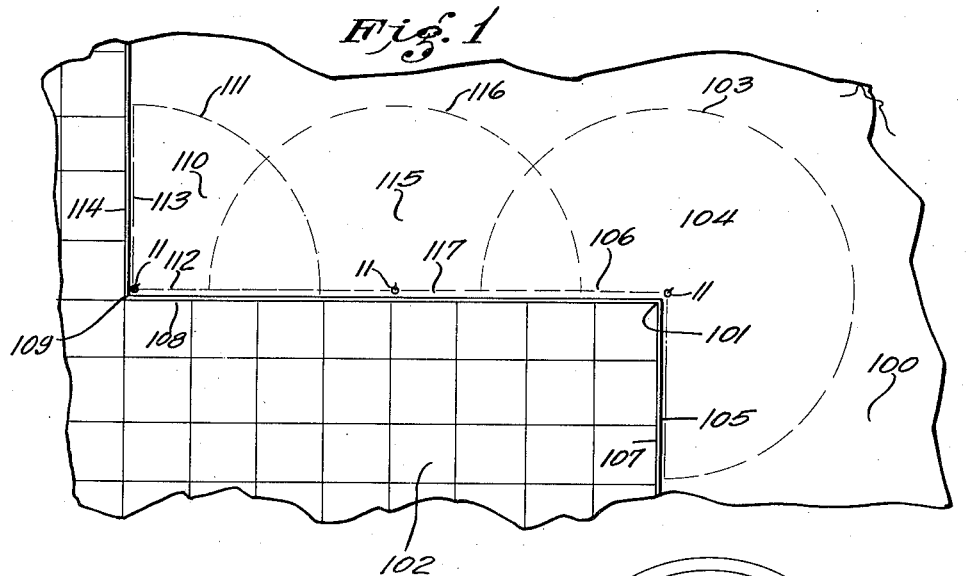
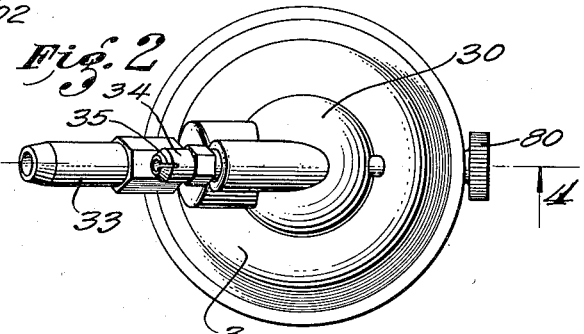
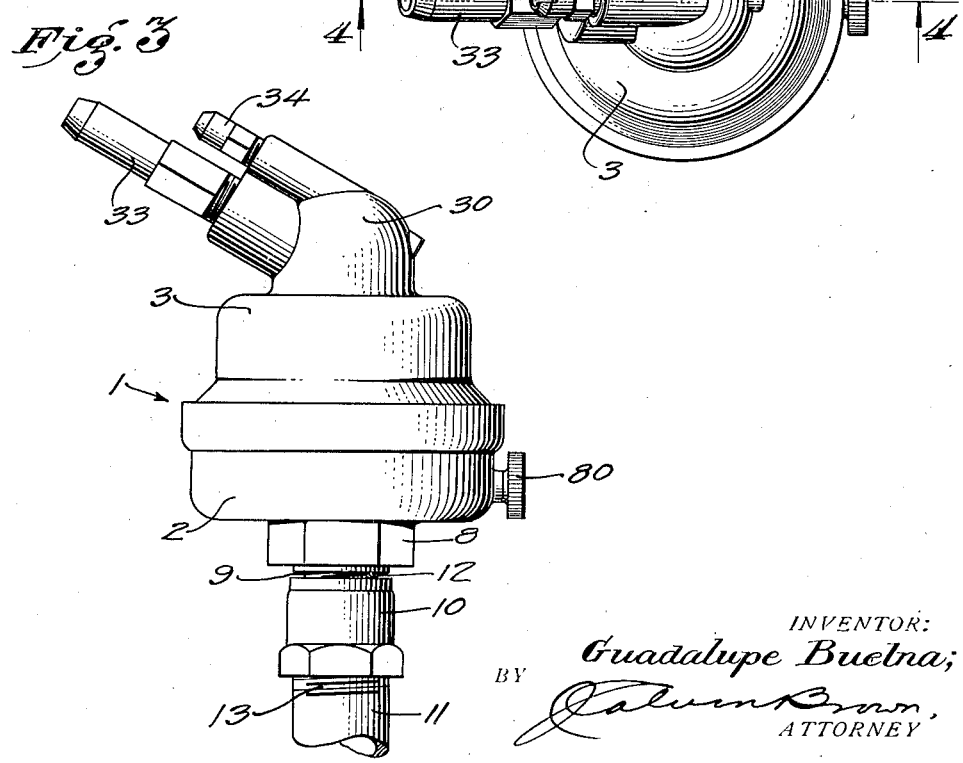
INVENTOR:
Guadalupe Buelna;
BY
ATTORNEY Feb. 16, 1937.     G. BUELNA     2,071,109
SPRINKLER
Filed March 12, 1935     2 Sheets-Sheet 2
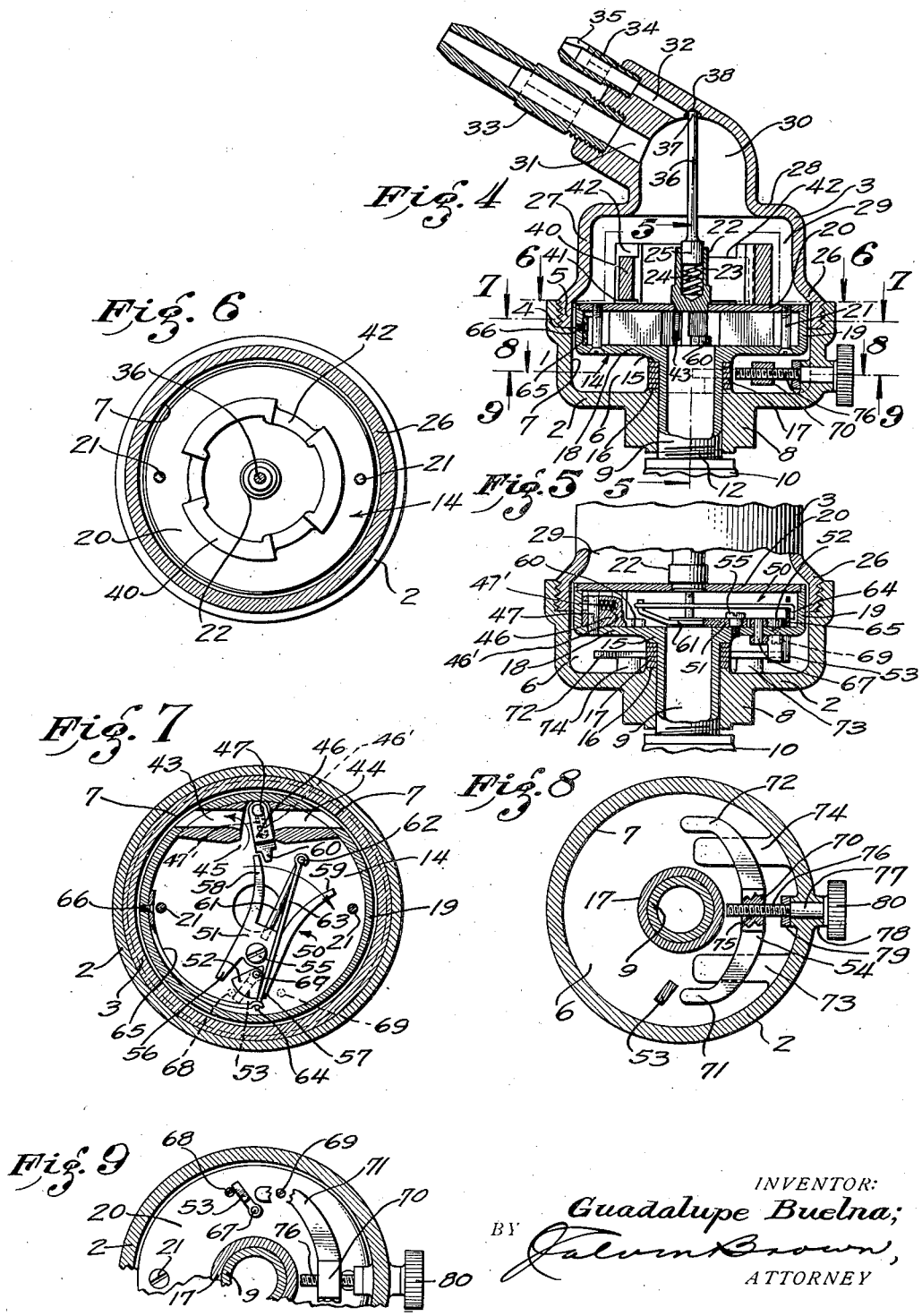
INVENTOR:
Guadalupe Buelna;
BY
ATTORNEY Patented Feb. 16, 1937

2,071,109

UNITED STATES PATENT OFFICE 2,071,109

SPRINKLER

Guadalupe Buelna, Santa Barbara, Calif., assignor of one-half to Henri Eugene Jeremie Vacher, Santa Barbara, Calif.

Application March 12, 1935, Serial No. 10,629

7 Claims. (Cl. 299—67)

This invention relates to lawn sprinklers, and particularly to a lawn sprinkler adapted to sprinkle a predetermined area.

The general object of the invention is to provide a sprinkler adapted to sprinkle a portion of a lawn around an external corner, or within an internal corner, or along a section of a walk, wall, or building without sprinkling the walk or building.

A more particular object is to provide a lawn sprinkler which may be adjusted to sprinkle a lawn from a central point over a predetermined area, within three hundred sixty degrees (360°), measured from said central point.

Other objects and advantages will appear hereinafter.

In the drawings:

Figure 1 is a fragmentary plan view of a lawn and walk, illustrating the operation of my invention in sprinkling said lawn around an external corner, within an internal corner and along a section of said walk, Figure 2 is a plan view of my sprinkler, Figure 3 is a side elevation of my sprinkler, Figure 4 is a transverse vertical longitudinal section of my sprinkler taken on line 4—4 of Figure 2, Figure 5 is a fragmentary transverse vertical section of my sprinkler taken on line 5—5 of Figure 4, Figure 6 is a horizontal section of my sprinkler taken on line 6—6 of Figure 4, Figure 7 is a horizontal section of my sprinkler taken on line 7—7 of Figure 4, Figure 8 is a horizontal section of my sprinkler taken on line 8—8 of Figure 4, and Figure 9 is a fragmentary horizontal section of my sprinkler taken on line 9—9 of Figure 4.

Referring with particularity to the drawings, I designates a casing formed in two sections, a lower section 2 and an upper section 3; said lower section being formed in its upper end with an internally threaded annular socket 4 to receive an externally threaded flange 5 on the lower end of said upper casing section, whereby the upper section 3 is screw-seated and detachably secured at its lower end in the upper end of the lower section 2. The lower casing section 2 forms a lower chamber 6 with an upstanding vertical cylindrical wall 7, the flange 5 on the lower end of the upper casing section 3 forming a portion of said wall at the upper end thereof. The lower casing section 2 is formed with a depending hub 8 which is turnably fitted on a vertical tube 9, the lower end of which tube is connected by a threaded union 10 to the upper end of a vertical stand pipe 11, said union being internally threaded to engage an external thread 12 on the lower end of said tube 9 and an external thread 13 on the upper end of said stand pipe 11. A valve chamber 14 is mounted on the upper end of the tube 9, and said tube is formed with an external annular bearing shoulder 15 on the under side of said valve chamber, between which bearing shoulder and a bearing shoulder 16, formed on the lower wall of the lower casing section 2 within the chamber 6, is arranged a multiple ring packing 17 which surrounds the tube 9 and prevents leakage from the casing through the hub 8. The valve chamber 14 comprises a lower wall 18 integral with the upper end of the tube 9, a vertical cylindrical side wall 19 integral with and upstanding from said lower wall, and a removable upper wall 20 which is fitted in the upper end of said side wall and is removably secured therein by screw bolts 21 extending upwardly through said lower wall 18 and screw seated at their upper ends in said upper wall.

The cylindrical side wall 19 of the valve chamber 14 rests close to the inner surface of the vertical cylindrical wall 7 of the chamber 6. A stud 22 extends upwardly from and is secured at its lower end in the upper wall 20 of the valve chamber 14, centrally of said valve chamber and the chamber 6, which stud is formed with a socket 23 extending downwardly therein from the upper end thereof to receive a coil spring 24 and a plunger 25, said spring resting at its lower end upon the lower end of said socket 23 and said plunger fitting in the upper end of said socket with its lower end resting upon the upper end of said spring for the purpose to be described. The side wall of the upper casing section 3 converges from the upper end of the threaded flange 5 of said section for a short distance over the valve chamber 14, as at 26, and extends vertically upward from said converging portion, as at 27, to an upper horizontal wall 28, forming an impeller chamber 29, and a dome 30 formed integral with said upper wall, extends upwardly from said upper wall and leads upwardly from said impeller chamber, and said dome is provided with a main outlet 31 and an auxiliary outlet 32 leading upwardly at an angle therefrom, said auxiliary outlet leading from the top of said dome. A main nozzle 33 is screw-seated in the outer end of said main outlet 31 and leads outwardly and axially from said outlet. A short auxiliary nozzle 34 is screw-seated in the outer end of the auxiliary outlet 32 and leads outwardly and axially from said auxiliary outlet. The auxiliary nozzle 34 is provided with a short longitudinal slot 35 extending from its outer end through its upper wall through which slot water is diverted upwardly and caused to spread and sprinkle an area within the area sprinkled by water passing out of the end of said auxiliary nozzle and the main nozzle 33. The plunger 25 is formed with an upwardly extending stem 36, the upper end 37 of which is conical to engage a conical end-thrust recess bearing 38 in the inner side of the top portion of the wall of the dome 30 at the center of said dome, for providing a journal and bearing for the upper end of the sprinkler casing 1 to turn upon, and for supporting said casing in an elevated position under the influence of the spring 24, bearing upwardly against the under side of the plunger 25, in which elevated position of the casing 1 the casing end-thrust bearing 16 engages the lower end of the ring packing 17 and holds the upper end of said ring packing against the end-thrust bearing 15 on the lower side of the valve chamber 14, whereby the upward movement of the sprinkler casing 1, under the influence of the spring 24, is limited, and said casing and the valve chamber 14 maintained in juxta-position.

In the impeller chamber 29 is located an impeller annulus 40 which surrounds the plunger socket stud 22 and rests loosely upon the upper wall 20 of the valve chamber 14, so that it may be shifted from one side to the other of the impeller chamber 29. The impeller annulus 40 is provided with notches 41 in its lower edge and with notches 42 in its upper edge to admit water more readily into said impeller annulus as the water enters the impeller chamber 29 from the valve chamber 14 in the manner hereinafter more fully described.

The valve chamber 14 is formed at one side with a pair of outlets 43 and 44 which extend in opposite direction through the side wall 19 of said chamber. Between the inner ends of said outlets 43 and 44 is provided an outlet entrance 45 in which an outlet valve 46 is pivoted at 47 to swing alternately against the inner ends respectively of said outlets, for controlling the flow of water from the valve chamber 14 out through said outlets into the annular space between the peripheral side wall 19 of said chamber and side wall 7 of the chamber 6 in the sprinkler casing 1, in the manner and for the purpose hereinafter more fully described. The valve 46 is provided with a bore 46' in which is fitted a spring 47' bearing at one end against the inner end of said bore and at its other end against the valve pivot 47 with sufficient friction to hold the valve normally against the inner end of either outlet 43 or 44.

Valve actuating means 50 are provided for alternately swinging the valve 46 to the right and to the left to close first the inner end of the outlet 44 and then the inner end of the outlet 43, so that water will flow from the valve chamber 14 first through the outlet 43 and then through the outlet 44, which operations are repeated during the operation of the sprinkler as will be hereinafter more fully described. Said valve actuating means 50 includes a valve actuating lever 51, a lever actuating cam 52, a cam actuating arm 53, and a double stop 54 which is engaged by said arm 53 for actuating said cam, lever 51 and the valve 46 in the manner hereinafter more fully described. The valve actuating lever 51 is pivoted upon the lower wall 18 of the valve chamber 14 by a screw 55, seated in said lower wall, and said lever is formed at one end with a pair of spaced cam-engaging arms 56 and 57 and at its other end with a pair of spaced and outwardly curved valve engaging arms 58 and 59, there being a lug 60 projecting from the valve 46 which is engaged by the ends of said arms 58 and 59 alternately for actuating said valve to close the inner end of the outlet 44 and the inner end of the outlet 43 alternately. A pin 61 is secured in the lever 51 centrally thereof between the arms 58 and 59 and extends to a point 62 slightly beyond the ends of said arms where it is bent and connected to one end of a link 63, the other end 64 of which link is bent at right angles and is engaged by the swinging end of a flat arcuate spring 65, the other end of which is secured to the inside of the side wall 19 of the valve chamber 14 by a screw 66. The spring 65 through the link 63 and pin 61 yieldingly holds the lever 51 against swinging movement either to the left or to the right for holding the valve 46 in position closing the inner end of the outlet 44 or the inner end of the outlet 43. The cam 52 is secured on the upper end of a pivot pin 67 between the lever arms 56 and 57, which pin extends downwardly through the lower wall 18 of the valve chamber 14, and carries on its lower end the cam actuating arm 53 which extends downwardly from the under side of the valve chamber 14. A pair of pins 68 and 69 are secured in the under side of the lower wall 18 of the valve chamber 14 to be engaged by the cam actuating arm 53 for limiting the swinging movement of said arm to the left and to the right respectively.

The stop 54 is fork shaped, comprising an intermediate hub 70 and a pair of arms 71 and 72 extending from opposite sides respectively of said hub to points at opposite sides respectively of the chamber 6, the ends of which arms being positioned to be engaged alternately by the cam-actuating arm 53 as the sprinkler casing 1 is oscillated in the manner hereinafter more fully described. Guides 73 and 74 are formed in the chamber 6 on the lower wall of the casing section 2, on which guides the stop arms 71 and 72 are slidably supported respectively. The hub 70 of the stop 54 is provided with a threaded bore 75 extending axially therethrough, and a screw 76 extends through said bore in threaded engagement therewith, which screw is formed at its outer end with a cylindrical shank 77 which extends through the vertical wall 7 of the chamber 6 and is turnably mounted in a bearing 78 in the vertical wall of the casing section 2. A nut 79 screws on the screw 76 against the inner end of the shank 77 for engaging the inner end of the bearing 78 to prevent outward movement of said screw and shank 77 with relation to said bearing and the casing section 2, and a thumb wheel 80 is secured on the outer end of said screw shank against the outer end of said bearing and prevents inward movement of the shank 77 and screw 76 with relation to said bearing 78 and casing section 2. Upon turning the thumb wheel 80, the screw 76 is turned in the threaded bore 75 of the stop hub 70 for adjusting the position of the stop 54 to the right or left for the purpose hereinafter more fully described.

The operation, uses and advantages of my invention are as follows:

The sprinkler being positioned on a lawn 100 with the stand pipe 11 adjacent an external corner 101 of a walk 102 as illustrated in Figure 1 of the drawings, and the stop 54 being adjusted so that its arms 71 and 72 will engage the cam arm 53 at the ends respectively of a selected degree of arc through which said cam arm may swing, water is supplied under pressure through said stand pipe 11, union 10 and tube 9 into the valve chamber 14, and with the valve 46 in position closing the outlet 44, as shown in Figure 7, the water passes from said valve chamber out through the outlet 43 into the space between the side wall of said valve chamber and the side wall 7 of chamber 6 against said side wall 7, whereupon the pressure of the water against the casing chamber wall 7 causes the sprinkler casing 1 and nozzles 33 and 35 to rotate counter-clockwise until the cam arm 53 engages the stop arm 72, whereupon said cam arm, through pin 67, swings the cam 52 counter-clockwise, and said cam, engaging the valve actuating lever arm 57, swings the valve actuating lever 51 counter-clockwise against the tension of spring 65 until the upper end 62 of the pin 61 passes to the left of the pivot 55 of the lever 51, whereupon said spring 65 through link 63 swings the lever 51 further in a counter-clockwise direction, until the arm 59 of said lever engages the valve lug 60 and swings the valve 46 to the left, during which movement of said lever and the valve 46, the valve opens the outlet 44 and closes the outlet 43, and the spring 65 through link 63 and pin 61 then holds the valve actuating lever 51 in the position it assumes when swung to the left, which position is determined by the engagement of the cam arm 53 with pin 69 and the engagement of the cam 52 with the arm 56 of said lever 51, while the arm 59 rests adjacent the right side of the valve lug 60 and holds the valve 46 against the inner end of the outlet 43, closing said outlet and opening outlet 44, said valve 46 being further held against said end of said outlet by the frictional engagement of the spring 47' with the pivot 47 of said valve. Water then passes from the valve chamber 14 out through the outlet 44 into the space between the side wall 19 of said chamber and the side wall 7 of the chamber 6 against said side wall 7, whereupon the pressure of the water against the casing chamber wall 7 causes the sprinkler casing 1 and nozzles 33 and 34 to rotate clockwise until the cam arm 53 engages the stop arm 71, whereupon said cam arm, through pin 67, swings the cam 52 clockwise, and said cam engaging the valve actuating lever arm 56, swings the valve actuating lever 51 clockwise against the tension of the spring 65, until the arm 58 of said lever engages the valve lug 60 and swings the valve 46 to the right, during which movement of said lever and the valve 46, the valve opens the outlet 43 and closes the outlet 44, and the spring 65, through link 63 and pin 61, then holds the valve actuating lever 51 in the position it assumes when swung to the right, which position is determined by the engagement of the cam arm 53 with the pin 68 and the engagement of the cam 52 with the arm 57 of the lever 51 while the arm 58 rests against the left side of the valve lug 60 and holds the valve 46 against the inner end of the outlet 44, closing said outlet and opening the outlet 43, said valve being further held against said end of said outlet by the frictional engagement of the spring 47' with the pivot 47 of said valve. Water then again passes from the valve chamber 14 out through outlet 43 and the above described operations are repeated. As the water passes through the outlets 43 and 44 into the space between the side wall 19 of the valve chamber and the side wall 7 of chamber 6, the chamber 6 is filled with water, and water passes upwardly through said space into the impeller chamber 29 through the impeller notches 41 and 42 into the impeller 40. Water passing from the outlet 43 upwardly through said space, between the side walls 19 and 7, respectively, of the valve chamber 14 and chamber 6, into the impeller chamber 29 and through the impeller notches 41 and 42 into the impeller 40, forces said impeller to the opposite side of the impeller chamber 29 and causes said impeller to rotate with pressure against the chamber wall 27 in a counterclockwise direction, which accelerates the counterclockwise motion of the sprinkler casing 1 and nozzles 33 and 31. Water passing from the outlet 44 upwardly through the space between the side walls 19 and 7, respectively, of the valve chamber 14 and chamber 6 into the impeller chamber 29 and through the impeller notches 41 and 42 into the impeller 40, forces said impeller to the opposite side of the impeller chamber 29 and causes said impeller to rotate with pressure against the chamber wall 27 in a clockwise direction, which accelerates the clockwise motion of the sprinkler casing 1 and nozzles 33 and 34. The oscillation of the sprinkler on its axis through an arc 103, when the sprinkler is located on the lawn 100 adjacent the external corner 101 of the walk 102, enables the sprinkler to sprinkle an area of said lawn around said external corner of said walk in the form of a sector 104 defined by said arc 103 and radial lines 105 and 106 extending from the axis of the sprinkler to the ends respectively of said arc, along the meeting edges 107 and 108 respectively, of said walk, without sprinkling the walk, the water passing from the impeller chamber 29 through the dome 30, main outlet 31, and main nozzle 33, and auxiliary outlet 32 and auxiliary nozzle 34, the main nozzle sprinkling the outer portion of the sectoral area 104 of the lawn 100 and the auxiliary nozzle sprinkling the inner portion of said sectoral area.

The sprinkler may be adjusted by turning the thumb wheel 80 and screw 76, so that the stop arms 71 and 72 will be positioned respectively to engage the cam arm 53 for reversing the oscillating movement of the sprinkler when it turns counterclockwise and clockwise, respectively; and when so adjusted the sprinkler may be placed in an internal corner 109 of the walk 102 for sprinkling the area of the lawn within said corner in the form of a sector 110, without sprinkling the walk 102, said sector being defined by the arc 111 and the radii 112 and 113 extending from the axis of the sprinkler to the ends respectively of said arc, said radii extending respectively along the edges 108 and 114 of the walk 102.

The sprinkler may also be adjusted by turning the thumb wheel 80 and screw 76, so that the stop arms 71 and 72 will be positioned to engage the cam arm 53 for reversing the oscillating movement of the sprinkler when it turns counterclockwise and clockwise respectively; and when so adjusted, that sprinkler may be placed adjacent the edge 108 of the walk 102 between the corners 101 and 109 for sprinkling the area of the lawn adjacent said edge in the form of sector 115, without sprinkling the walk 102, said sector being defined by the arc 116 and the diameter 117 extending through the axis of the sprinkler along the edge 108 of the walk 102, the sector 115 overlapping the sprinkled sectors 104 and 110; whereby the lawn 100 is sprinkled over a continuous area from the upper edge of the walk 102 extending from the corner 101 to the corner 109, without sprinkling the walk.

The sprinkler may be readily taken apart by unscrewing the threaded flange 5 of the upper casing section 3 from the threaded socket 4 of the lower casing section 2.

It is obvious that various changes and modifications and variations may be made in practicing the invention in departure from the particular showing of the drawings without departing from the true spirit thereof as defined by the scope of the appended claims.

I claim:

1. In a lawn sprinkler, a casing provided with an outlet, a valve chamber mounted in said casing, said casing being rotatably mounted relative to said valve chamber, means for supplying water under pressure to said valve chamber, said valve chamber being formed at one side of its center with a pair of outlets so extending in opposite directions through its side wall as to so respectively direct water from said valve chamber against the adjacent side wall of said casing as to rotate said casing respectively in opposite directions, a valve in said valve chamber controlling said outlets, and means for actuating said valve to close one of said outlets and open the other outlet for reversing the rotary motion of said casing when said casing has rotated a predetermined degree in either direction.

2. In a lawn sprinkler, a casing provided with an outlet, a valve chamber mounted in said casing, said casing being rotatably mounted relative to said valve chamber, means for supplying water under pressure to said valve chamber, said valve chamber being formed at one side of its center with a pair of outlets so extending in opposite directions through its side wall as to so respectively direct water from said valve chamber against the adjacent side wall of said casing as to rotate said casing respectively in opposite directions, a valve in said valve chamber controlling said outlets, means for actuating said valve to close one of said outlets and open the other outlet for reversing the rotary motion of said casing when said casing has rotated a predetermined degree in either direction, and means for varying the degree of rotation of said casing.

3. In a lawn sprinkler, a casing provided with an outlet, a valve chamber mounted in said casing, said casing being rotatably mounted relative to said valve chamber, means for supplying water under pressure to said valve chamber, said valve chamber being formed at one side of its center with a pair of outlets so extending in opposite directions through its side wall as to so respectively direct water from said valve chamber against the adjacent side wall of said casing as to rotate said casing respectively in opposite directions, a valve in said valve chamber controlling said outlets, a valve actuating lever mounted in said valve chamber, a cam pivoted in said valve chamber for swinging said lever to cause said lever to engage and swing said valve to close either of said outlets and open the other outlet, an arm secured on the pivot of said cam, and a stop in said casing for engaging said cam arm when said casing is rotated a predetermined degree in either direction, for swinging and causing said cam to swing said lever and said lever to engage and swing said valve to open the closed outlet and close the open outlet, for reversing the rotary motion of said casing.

4. In a lawn sprinkler, a casing provided with an outlet, a valve chamber mounted in said casing, said casing being rotatably mounted relative to said valve chamber, means for supplying water under pressure to said valve chamber, said valve chamber being formed at one side of its center with a pair of outlets so extending in opposite directions through its side wall as to so respectively direct water from said valve chamber against the adjacent side wall of said casing as to rotate said casing respectively in opposite directions, a valve in said valve chamber controlling said outlets, a valve actuating lever mounted in said valve chamber, a cam pivoted in said valve chamber for swinging said lever to cause said lever to engage and swing said valve to close either of said outlets and open the other outlet, an arm secured on the pivot of said cam, a stop in said casing for engaging said cam arm when said casing is rotated a predetermined degree in either direction, for swinging and causing said cam to swing said lever and said lever to engage and swing said valve to open the closed outlet and close the open outlet, for reversing the rotary motion of said casing, a pin on said lever, a link connected at one end to said pin, and a spring secured to said casing and having its swinging end connected to the other end of said link for holding said lever in engagement with said valve, and holding said valve in position closing either of said outlets.

5. In a lawn sprinkler, a casing provided with an outlet, a valve chamber mounted in said casing, said casing being rotatably mounted relative to said valve chamber, means for supplying water under pressure to said valve chamber, said valve chamber being formed at one side of its center with a pair of outlets so extending in opposite directions through its side wall as to so respectively direct water from said valve chamber against the adjacent side wall of said casing as to rotate said casing respectively in opposite directions, a valve in said valve chamber controlling said outlets, a valve actuating lever mouned in said valve chamber, a cam pivoted in said valve chamber for swinging said lever to cause said lever to engage and swing said valve to close either of said outlets and open the other outlet, an arm secured on the pivot of said cam, a stop in said casing for engaging said cam arm when said casing is rotated a predetermined degree in either direction, for swinging and causing said cam to swing said lever and said lever to engage and swing said valve to open the closed outlet and close the open outlet, for reversing the rotary motion of said casing, and means for adjusting the position of said stop for varying the degree of rotation of said casing at which said cam arm engages said stop for reversing the rotary motion of said casing.

6. In a lawn sprinkler, a casing provided with an outlet, a valve chamber mounted in said casing, said casing being rotatably mounted relative to said valve chamber, means for supplying water under pressure to said valve chamber, said valve chamber being formed at one side of its center with a pair of outlets so extending in opposite directions through its side wall as to so respectively direct water from said valve chamber against the adjacent side wall of said casing as to rotate said casing respectively in opposite directions, a valve in said valve chamber controlling said outlets, a valve actuating lever mounted in said valve chamber, a cam pivoted in said valve chamber for swing said lever to cause said lever to engage and swing said valve to close either of said outlets and open the other outlet, an arm secured on the pivot of said cam, a stop in said casing for engaging said cam arm when said casing is rotated a predetermined degree in either direction, for swinging and causing said cam to swing said lever and said lever to enage and swing said valve to open the closed outlet and close the open outlet, for reversing the rotary motion of said casing, said stop comprising a hub provided with a threaded bore and a pair of stop arms extending from opposite sides of said hub, and a screw extending through the wall of said casing and through said hub bore in threaded engagement therewith for adjusting said stop for varying the degree of rotation of said casing at which said cam arm engages said stop arms respectively for reversing the rotation of said casing.

7. In a lawn sprinkler, a tube, a sprinkler casing formed on its lower side with a hub bearing through which said tube extends and on which tube said hub is turnably mounted, said casing being provided with an outlet, a valve chamber mounted on said tube within said casing into which chamber water under pressure enters from said tube, a packing ring surrounding said tube between the lower wall of said casing and said valve chamber, a socket mounted on the upper wall of said valve chamber in axial alignment with said tube and valve chamber, a spring seated in said socket, a plunger, the lower end of which is fitted in said socket and rests upon said spring and the upper end of which is conical and engages a conical recess bearing in the inner side of the upper wall of said casing, holding said casing elevated with said packing ring engaged between the lower wall of said casing and said valve chamber; said valve chamber being formed with a pair of outlets so extending in opposite directions through its side wall as to respectively direct water from said valve chamber against the adjacent side wall of said casing as to rotate said casing respectively in opposite directions, a valve in said valve chamber controlling said outlets, and means for actuating said valve to close one of said outlets and open the other outlet for reversing the rotary motion of said casing, when said casing has rotated a predetermined degree in either direction.

GUADALUPE BUELNA.